United States Patent
Bass

(10) Patent No.: US 7,654,613 B2
(45) Date of Patent: Feb. 2, 2010

(54) HEAD AND BODY PROTECTION SYSTEM FOR A CHILD SAFETY SEAT

(76) Inventor: Eric Bass, P.O. Box 1131, Tavernier, FL (US) 33070

( * ) Notice: Subject to any disclaimer, the term of this patent is extended or adjusted under 35 U.S.C. 154(b) by 0 days.

(21) Appl. No.: 12/013,936

(22) Filed: Jan. 14, 2008

(65) Prior Publication Data

US 2009/0179469 A1 Jul. 16, 2009

(51) Int. Cl.
| A47D 1/10 | (2006.01) |
| B60N 2/42 | (2006.01) |
| B60R 21/00 | (2006.01) |
| B60R 21/06 | (2006.01) |
| B60R 21/16 | (2006.01) |
| B60R 21/23 | (2006.01) |
| B60R 21/233 | (2006.01) |
| B60R 21/26 | (2006.01) |

(52) U.S. Cl. .............. 297/250.1; 297/219.12; 297/216.11

(58) Field of Classification Search ............. 297/250.1, 297/219.12, 216.12, 216.11
See application file for complete search history.

(56) References Cited

U.S. PATENT DOCUMENTS

| 3,265,438 A | 8/1966 | Regan et al. |
| 3,784,224 A | 1/1974 | Peeler |
| 4,402,548 A * | 9/1983 | Mason ........................ 297/464 |
| 4,687,452 A * | 8/1987 | Hull ........................... 441/131 |
| 5,292,175 A | 3/1994 | Artz |
| 5,292,176 A | 3/1994 | Artz |
| 5,330,255 A | 7/1994 | Stawicki |
| 5,335,968 A * | 8/1994 | Sheridan et al. ........... 297/250.1 |
| 5,383,711 A * | 1/1995 | Houghteling ............... 297/397 |
| 5,516,188 A | 5/1996 | Bruhnke et al. |
| 5,588,699 A | 12/1996 | Rundle et al. |
| 5,720,519 A | 2/1998 | Barnes |
| 5,765,893 A | 6/1998 | Ziegler |
| 5,779,304 A * | 7/1998 | Cunningham .......... 297/216.11 |
| 6,179,383 B1 * | 1/2001 | Ochi ........................ 297/250.1 |
| 6,199,900 B1 | 3/2001 | Ziegler |
| 6,402,251 B1 | 6/2002 | Stoll |

(Continued)

FOREIGN PATENT DOCUMENTS

| DE | 3544041 A1 * | 6/1987 | ............... 297/250.1 |

(Continued)

Primary Examiner—Rodney B White
(74) Attorney, Agent, or Firm—McHale & Slavin, P.A.

(57) ABSTRACT

A head protection assembly which can be secured to a seat includes a plurality of chambers or pads, inflated to a preselected pressure which provide protection of the occupant of the seat from side and rear impacts. The head protection assembly is placed in a seat in lateral alignment with the side of the head of an occupant of the seat and adjusted to restrain movements of the head caused by vehicle collisions. The chambers or pads are inflated or deflated to permit the chambers or pads to be adjusted to the size of the occupant of the seat. The assembly includes a device to indicate the correct inflation pressure. The chambers or pads are fluidly interconnected to distribute fluid throughout the assembly to help absorb the impact of the head of the occupant. The chambers or pads can be secured to an existing seat to afford additional protection or can be incorporated into the seat during the manufacture of the seat. An inflatable body restraint can also be provided to help protect the occupant of the seat.

9 Claims, 9 Drawing Sheets

U.S. PATENT DOCUMENTS

| | | | | |
|---|---|---|---|---|
| 6,685,266 | B2* | 2/2004 | James et al. | 297/250.1 |
| 6,715,830 | B2* | 4/2004 | Alexy | 297/250.1 |
| 7,125,073 | B2* | 10/2006 | Yoshida | 297/216.11 |
| 7,232,182 | B2* | 6/2007 | Yoshida | 297/216.11 |
| 7,232,185 | B2 | 6/2007 | Hartenstine et al. | |
| 7,234,711 | B2 | 6/2007 | Gordon et al. | |
| 7,234,771 | B2* | 6/2007 | Nakhla | 297/250.1 |
| 7,293,828 | B2* | 11/2007 | Yoshida | 297/216.11 |
| 7,413,249 | B2* | 8/2008 | Leutert | 297/237 |
| 2004/0164529 | A1* | 8/2004 | Yoshida | 280/730.2 |
| 2004/0251721 | A1* | 12/2004 | Yoshida | 297/250.1 |
| 2005/0099044 | A1* | 5/2005 | Nakhla | 297/219.12 |
| 2005/0179288 | A1* | 8/2005 | Lizaso et al. | 297/250.1 |
| 2006/0061186 | A1 | 3/2006 | Funke et al. | |
| 2007/0085394 | A1* | 4/2007 | Yang | 297/250.1 |
| 2009/0152913 | A1* | 6/2009 | Amesar et al. | 297/216.11 |

FOREIGN PATENT DOCUMENTS

| | | |
|---|---|---|
| DE | 19817329 | 4/1998 |
| JP | 2000343991 | 12/2000 |

* cited by examiner

HEAD AND BODY PROTECTION SYSTEM FOR A CHILD SAFETY SEAT

FIELD OF THE INVENTION

The invention relates to head and body protection systems for safety seats for vehicles. In a preferred embodiment, the invention is an assembly or assemblies which can be secured to a safety seat for children and is intended to provide an improved level of protection from impacts to the head and body of the occupant of the safety seat during vehicle accidents or sudden stops.

BACKGROUND OF THE INVENTION

The neck of an individual, in particular a child, is not strong enough to hold the individual's head in a position to prevent damage to the head during vehicle accidents or sudden stops. While many vehicle seats are provided with head restraints to protect an adult occupant of the seat from rearward motion during an accident, the seats do not include restraints to afford the occupant protection from side impacts. This is also true for child safety seats. While the child safety seat affords some protection from side impacts, it is not sufficient to prevent neck and back injury. Physically handicapped individuals are also susceptible to head injuries which may occur in vehicle collisions or sudden stops and will benefit from the present invention.

DESCRIPTION OF THE PRIOR ART

U.S. Pat. No. 5,330,255 discloses a U-shaped collar including an inflatable bladder, decorative cover and a means to attach the inflatable neck support to the seat back or head restraint so as to provide an inflatable neck support. The inflatable neck support is easily adjusted by the seat occupant to meet the particular comfort needs of the seat occupant.

U.S. Pat. No. 5,516,188 discloses a device comprising as least two inflatable air chambers that form a child seat for use in a vehicle. One air chamber forms as inflatable air cushion and the other chambers represent inflatable side panels, backrest, head restraint and a tray.

U.S. Pat. No. 5,588,699 discloses a one-piece inflatable structure that fits an infant attached to a restraining mechanism. The upper portion thereof having a centrally disposed aperture for placement about the infant's neck to cushion the head should a sudden movement or contact occur, a middle section thereof positionable over the infant's chest providing a cushioned area and harness support and a lower section thereof which accommodates a portion of each of the infant's thighs and placement of the seat belt. The device operates in protecting the infant's head, neck and chest from injury by maintaining the head and neck in a substantially vertical position.

U.S. Pat. No. 5,720,519 discloses a seat structure, an air bag and an activation circuitry. The device is equipped with an alarm and/or air bag system for delivering a notification signal that the seat is properly installed and the air bag is functional. Upon activation, the air bag system, which is stored in a collapsed state within the child's seat, is rapidly expanded in front of the child so as to provide a cushioning blow in order to protect the seated child from injury upon a sudden deceleration of the vehicle.

U.S. Pat. No. 5,765,893 discloses a device for preventing head and neck injuries comprising a shell and padded lining shaped to partially enclose an infant when the restraint is attached to an infant vehicle seat. The lining includes distinct areas of different density within the padding to better absorb energy generated by an impact. The restraint further includes adjustments for fitting the restraint apparatus to different infant length sizes. The device is directed to reducing head and neck injuries in infants in moving vehicles.

U.S. Pat. No. 6,199,900 discloses a headrest including an air bag, which is inflated between the headrest and the seat upon occurrence of a collision, a fluid pressure actuation, to move the headrest to the upper position upon occurrence of a collision and at least one collision sensor to detect the occurrence of a collision. The vehicle safety collision headrest substantially instantaneously moves a headrest of a seat from a manually adjusted position to a fully extended position using a fluid pressure actuation system and inflates a front air bag between the bottom of the extended headrest and the top of the set to fill the gap there between upon the occurrence of a collision or an abrupt stop. The vehicle safety collision headrest protects against whiplash, head, neck and spinal cord injuries due to improper designed and/or positioned headrests.

U.S. Pat. No. 7,234,711 discloses a side protective head restraint pad, pad assembly and safety seat. The restraint pad includes an air bladder with a pump for selectively inflating the air bladder and a release valve for selectively deflating the air bladder, an energy-absorbing component and a comfort component. A flexible enclosure is provided within which the air bladder, energy-absorbing component and comfort component are positioned in overlaid configuration to define a unit. The head restraint pad is adapted for being placed in a seat in lateral alignment with one side of the head of an occupant and inflated or deflated as appropriate to restrain the head against injurious lateral movement caused by a side impact relative to the seat.

U.S. Pat. No. 7,232,185 discloses a head rest for a car seat used to transport a child in an automobile which is positionally adjustable vertically along the seat back on which the head rest is mounted. A latching mechanism is actuated by a button at the top of the head rest and includes a releasable latch engagable with the channels slidably supporting the support rails of the head rest. A retainer clip is mounted at the top of the channels to prevent the head rest from being separated from the seat back once assembled thereon. The head rest includes a pair of laterally spaced wings that are pivotally connected to the rear support portion of the headrest to be positionally adjustable relative to the child's head through an angular displacement of approximately 45 degrees. The pivot mechanism is operable to lock the wings in the selected positions.

U.S. Published Patent Application No. 2006/0061186 discloses an elastic, one-piece support band, a soft head pad which rests against an infant's head and two sets of fasteners. The support band passes through the head pad and is attached to a car seat with fasteners to support an infant's head in an upright position against the back of a car seat. The support band acts as a support system for a sleeping infant so that the infant's head does not roll around.

What is needed in the art is a head protection system for the occupant of a seat, such as a child's safety seat, which can be attached to an existing seat or provided as original equipment. The head protection system utilized a plurality of pads which can be inflated to offer protection to the head of an occupant of the seat and position the head protection system relative to the head of an occupant of the seat to afford maximum protection. The head protection system also includes a device to indicate when it is inflated to the correct pressure to afford the proper protection. The head protection system can also employ foam in place of inflated pads to afford protection to the head of the occupant. The seat can also be provided with a restraining device to protect the body of an occupant in the seat from impacts caused by vehicle accidents and sudden stops.

SUMMARY OF THE INVENTION

A head protection assembly which can be secured to a seat includes a plurality of chambers or pads, inflated to a preselected pressure which provide protection of the occupant of the seat from side and rear impacts. The head protection assembly is placed in a seat in lateral alignment with the side of the head of an occupant of the seat and adjusted to restrain movements of the head caused by vehicle collisions. The chambers or pads are inflated or deflated to permit the chambers or pads to be adjusted to the size of the occupant of the seat. The assembly includes a device to indicate the correct inflation pressure. The chambers or pads are fluidly interconnected to distribute fluid throughout the assembly to help absorb the impact of the head of the occupant. The chambers or pads can be secured to an existing seat to afford additional protection or can be incorporated into the seat during the manufacture of the seat.

Accordingly, it is an objective of the instant invention to provide a head protection assembly which will provide protection to the head of an occupant of a seat from side and rear impacts.

It is a further objective of the instant invention to provide a head protection assembly which can be secured to a child safety seat as an after market product or incorporated into the child safety seat during manufacture of the seat.

It is yet another objective of the instant invention to provide a head protection assembly that incorporates side and rear impact protection pads.

It is a still further objective of the instant invention to provide a head protection assembly that includes adjustable pads for providing improved protection from side and rear impacts.

It is still yet another objective of the instant invention to provide a head protection assembly that includes an air chamber for allowing the thickness of the pads to be increased or decreased by inflating or deflating the air chamber thereby permitting optimal fit of the assembly to the occupant of the seat.

It is yet a further objective of the instant invention to provide a head protection assembly that includes a plurality of pads that can be individually inflated or deflated to permit optimal fit of the assembly to the occupant of the seat.

It is still a further objective of the instant invention to provide a head protection assembly that includes an indicator for indicating the correct inflation pressure of the head protection assembly.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
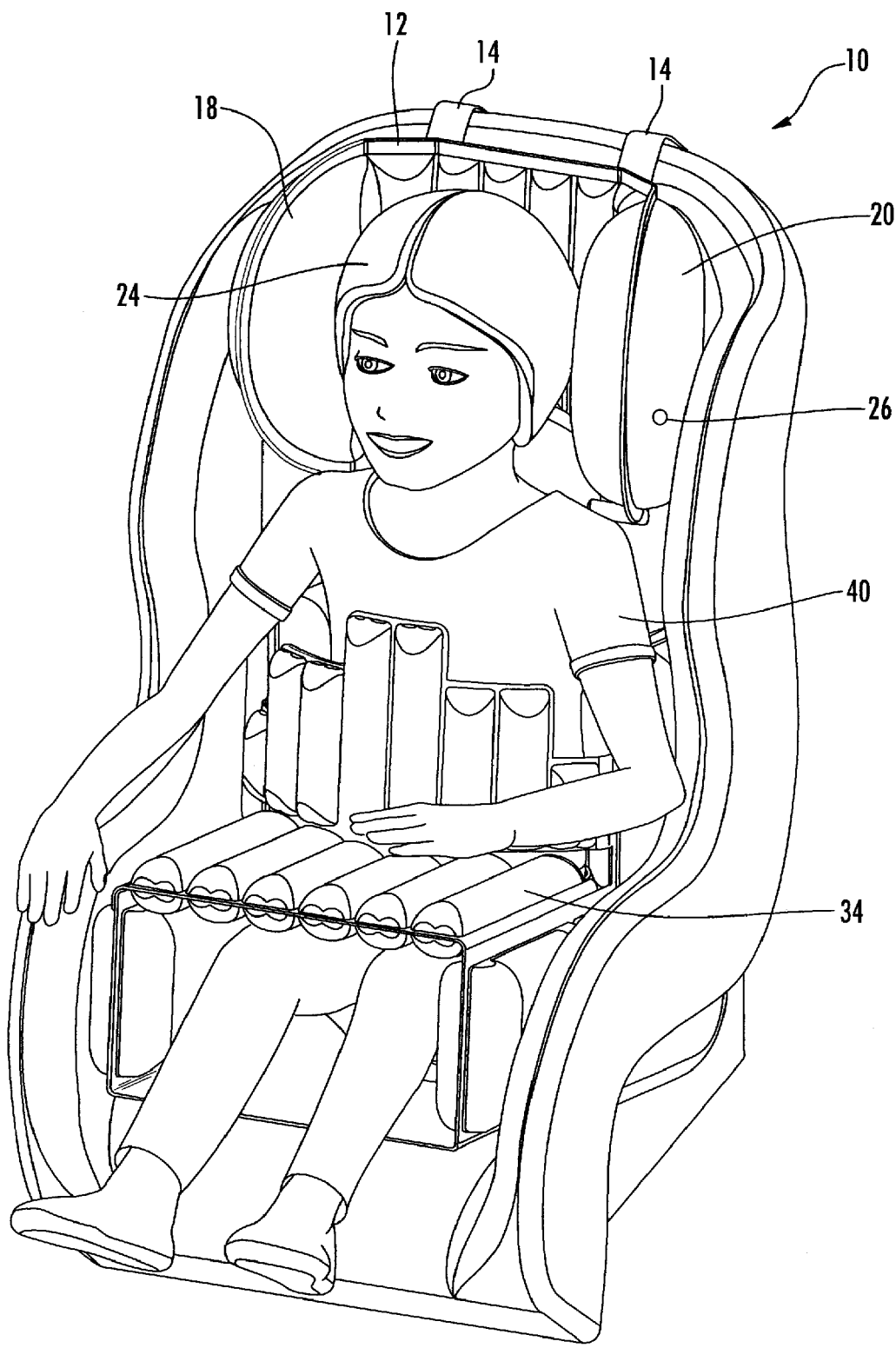
FIG. 1 is a front perspective view of the head protection assembly and body protection assembly of the present invention secured to a child safety seat and an individual seated therein.
Figure 2:
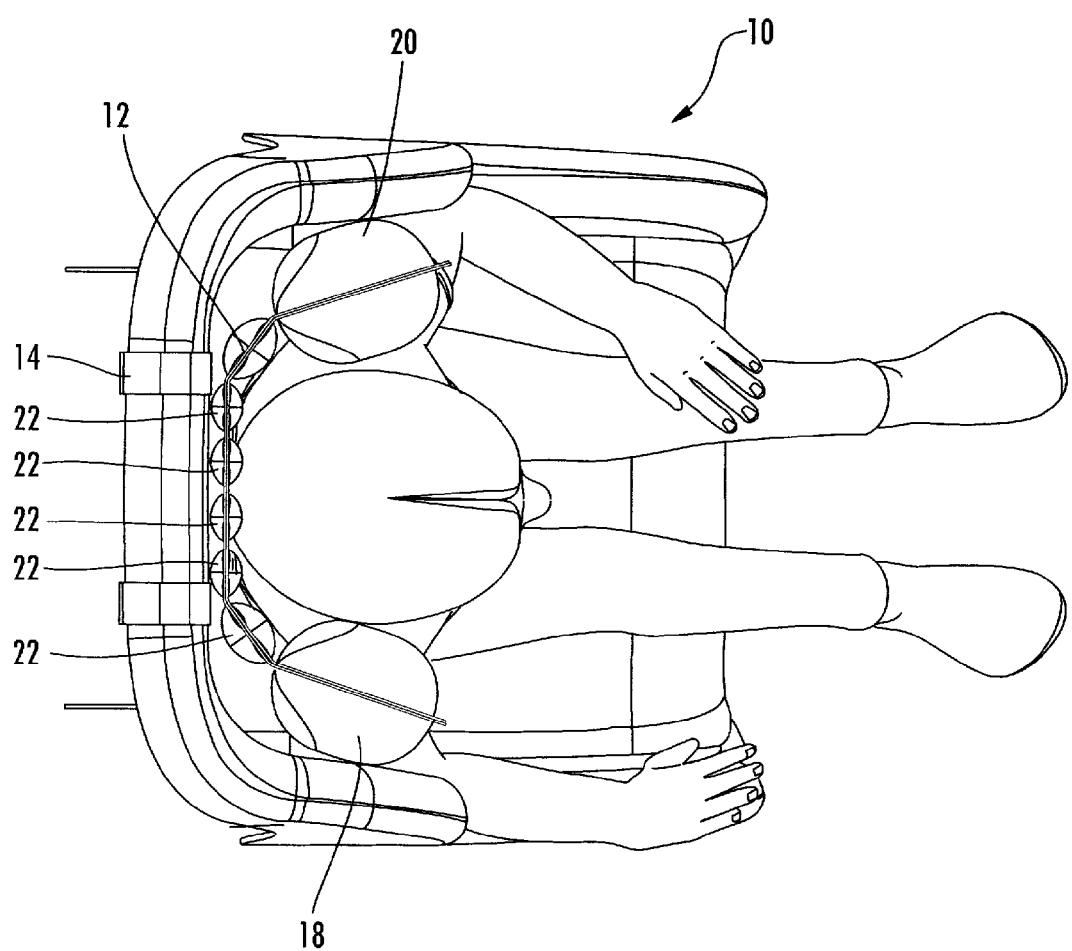
FIG. 2 is a top view of the head protection assembly of the present invention of FIG. 1 without the body protection assembly.
Figure 3:
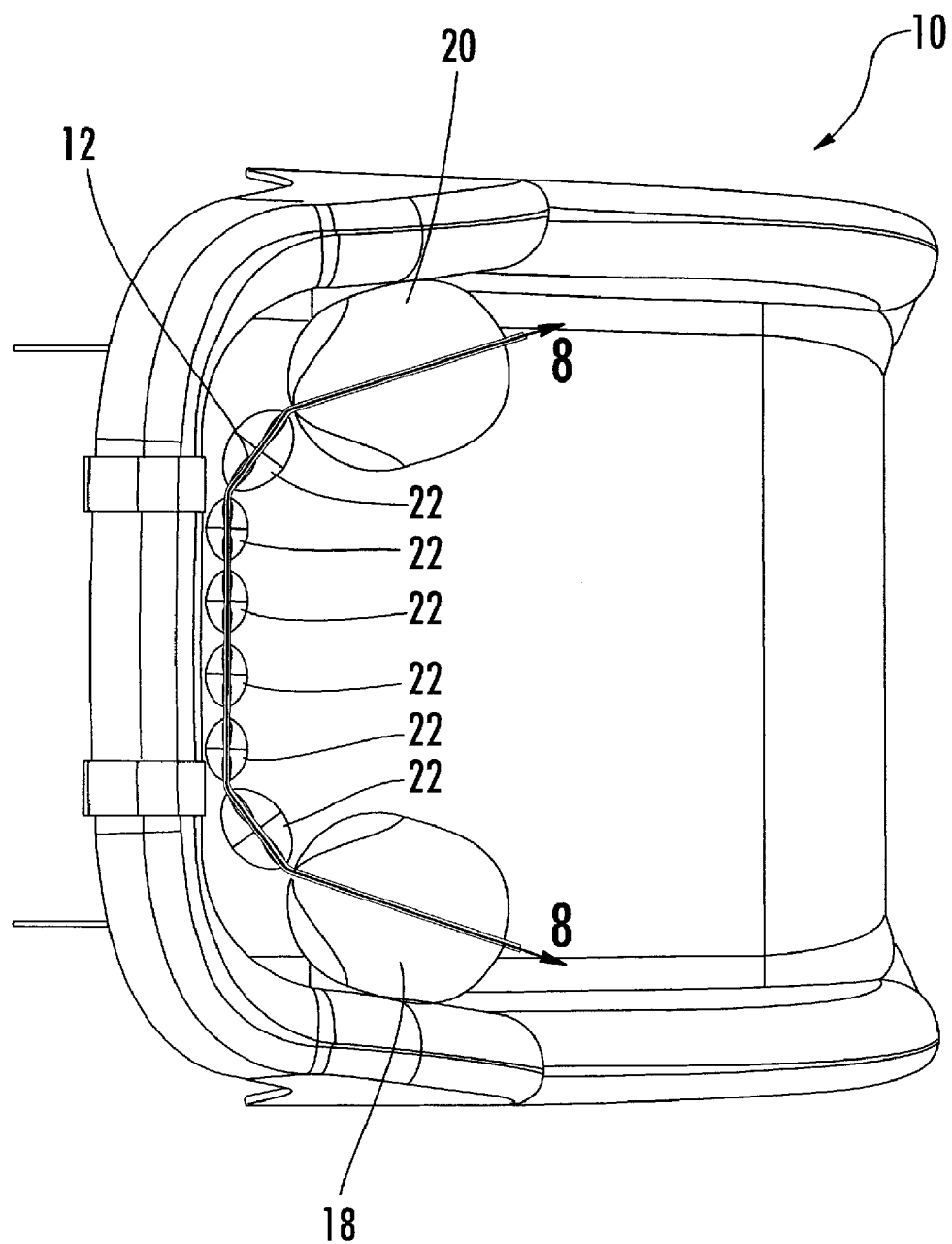
FIG. 3 is a top view of the head protection assembly of the present invention secured to a child safety and without an individual in the seat.

Referring now to the drawings a seat 10 is illustrated in FIGS. 1-9. In a preferred embodiment of the invention the seat is a child safety seat. The seat can also be sized and adjusted to accommodate a physically handicapped individual. A head protection assembly 12 is secured to an upper portion of the seat 10. A plurality of straps 14 are utilized to secure the head protection assembly 12 to the seat. FIG. 2 illustrates the straps 14 secured to a rear portion of the head protection assembly. The straps are passed around the rear of the seat 10 through holes 16 in the seat and back to the rear portion of the head protection assembly. The straps can be continuous elements or one end of the strap can be secured to an upper portion of the assembly and the other end of the strap can be secured to a lower portion of the assembly. The head protection assembly can also be rigidly secured to the seat.

Figure 4:
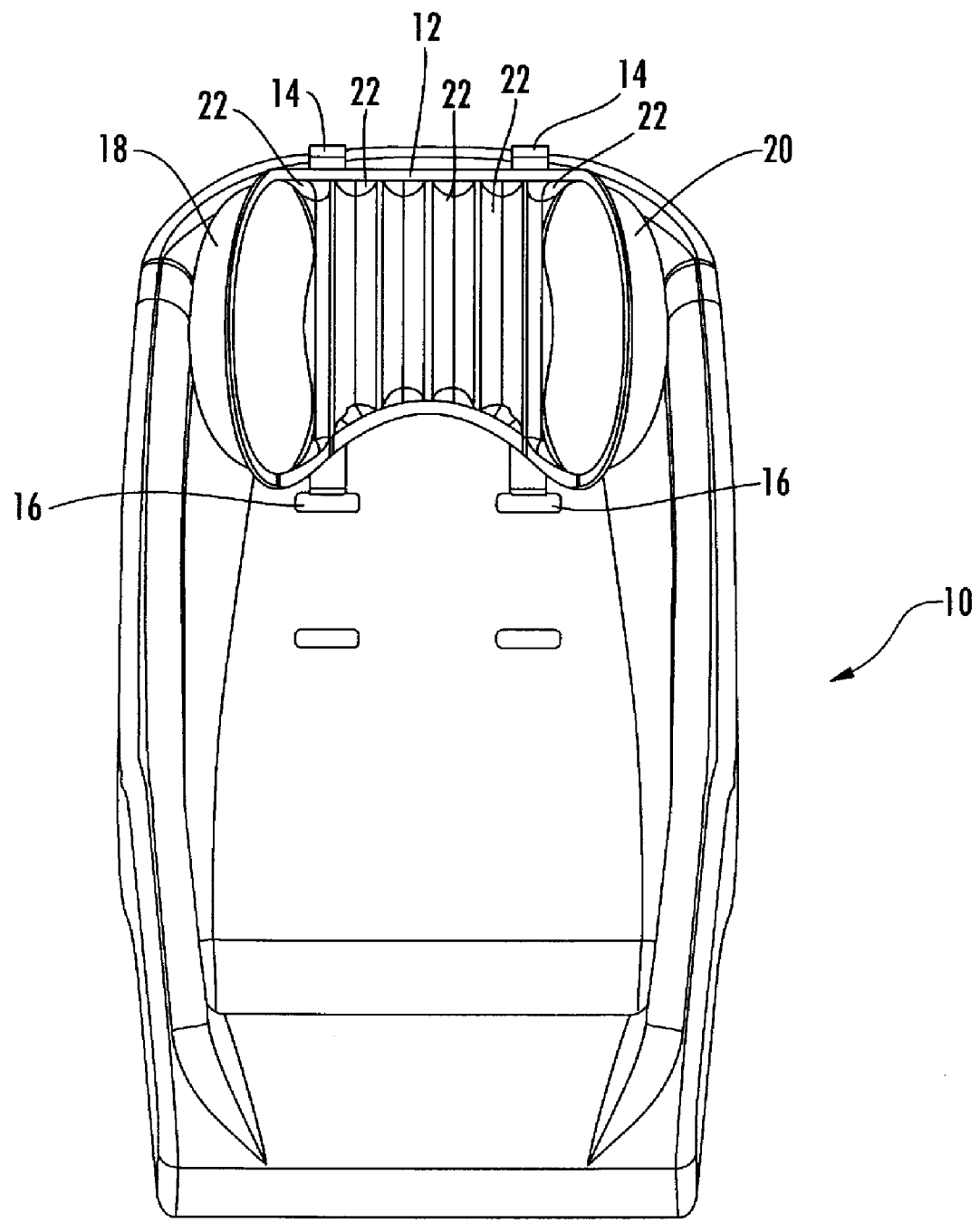
FIG. 4 is a front view of the child safety seat including the head protection assembly of the present invention secured thereto.
Figure 5:
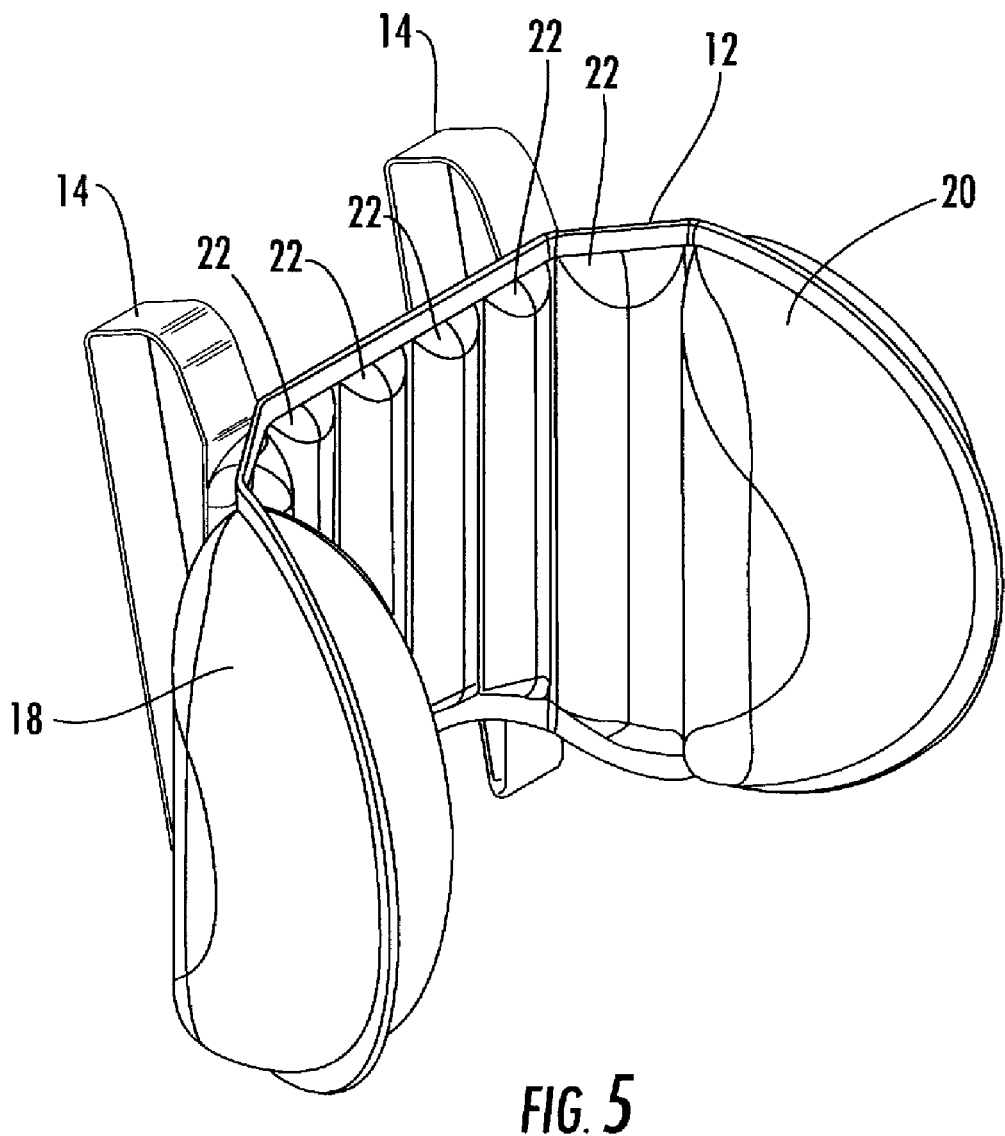
FIG. 5 is a front perspective view of the head protection assembly of the present invention.
Figure 6:
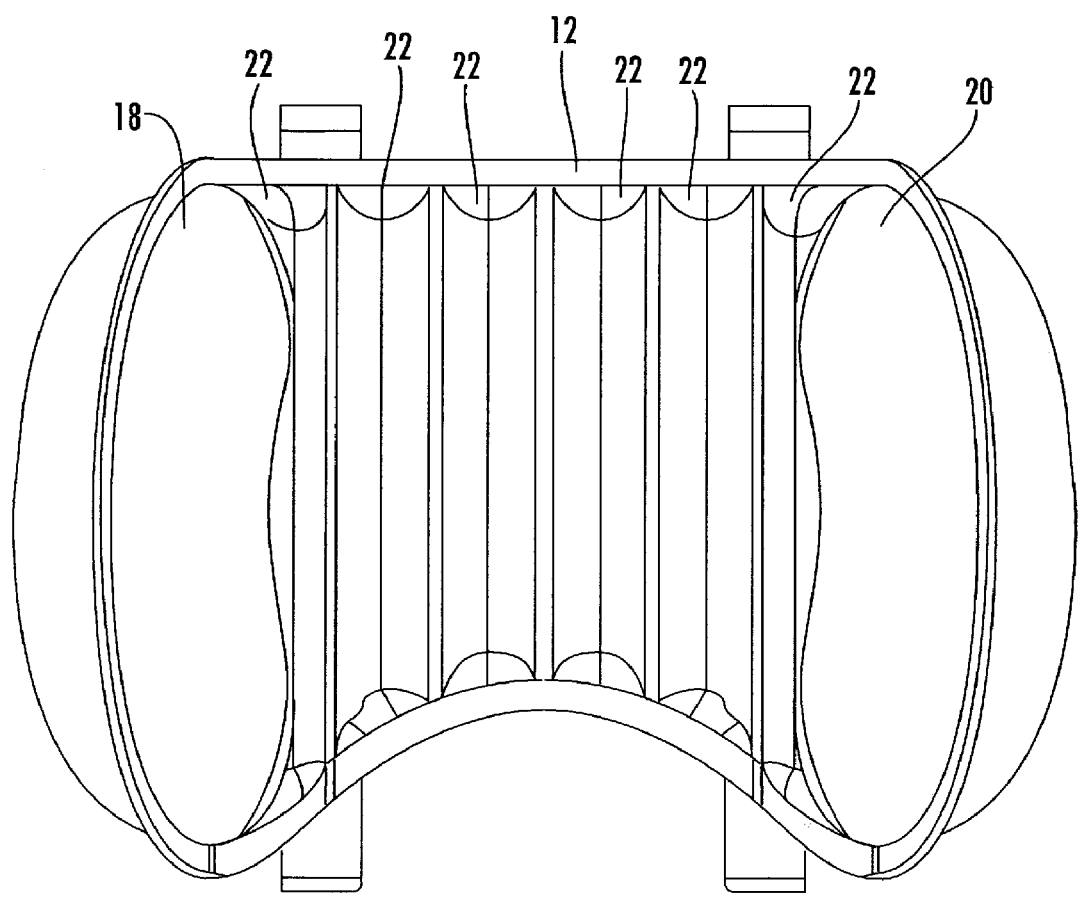
FIG. 6 is a front view of the head protection assembly of the present invention.
Figure 7:
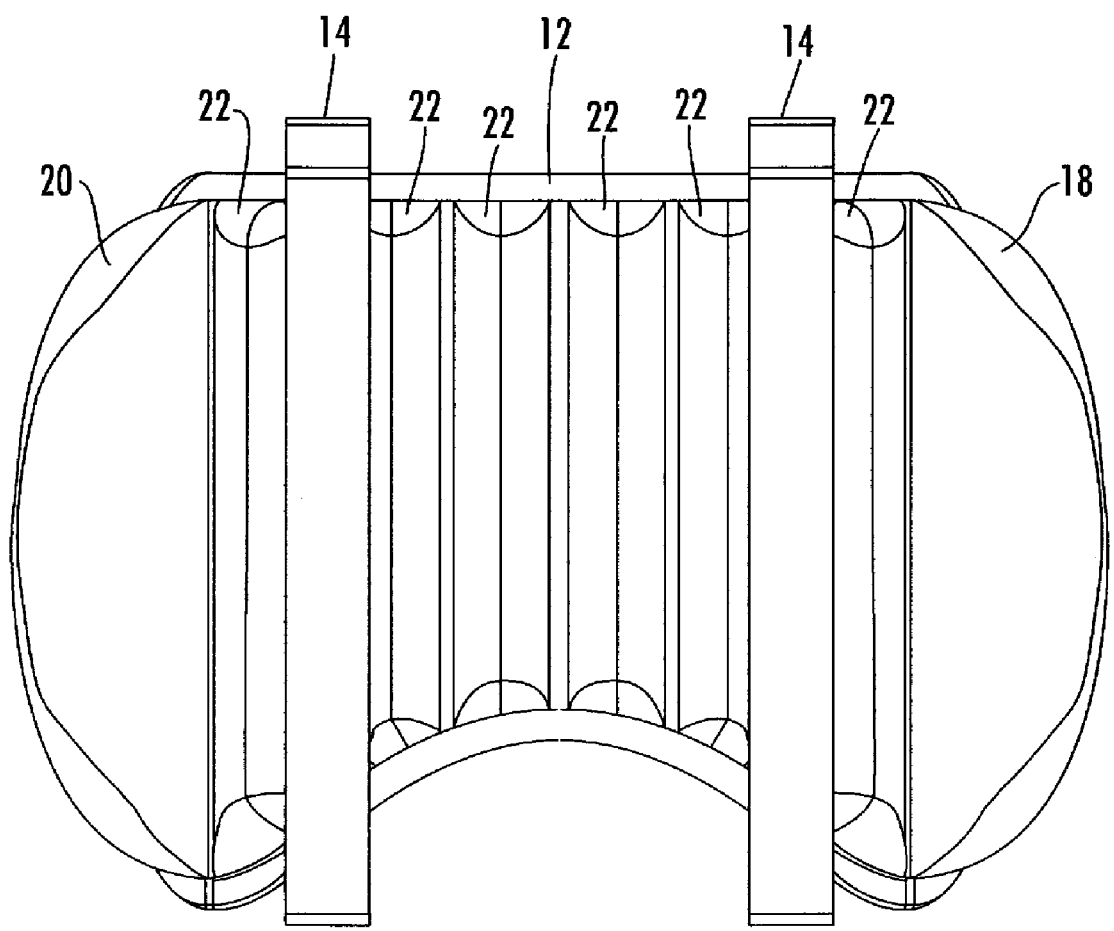
FIG. 7 is a rear of the head protection assembly of the present invention.

In a preferred embodiment of the invention, the head protection assembly comprises two large chambers or pads 18, 20 located at the ends of the assembly. A plurality of smaller chambers or pads 22 are located in between chambers 18 and 20 (FIGS. 4 and 6). In other embodiments a single pad or multiple pads of similar sizes can be employed. Pads 18, 20 and 22 provide protection of the seat occupant's head 24 from side or lateral impacts. Pads 22 provide protection of the seat occupant's head 24 from rear impacts. Pads 22 will also afford protection in the event that the occupant's head is thrown forward and then rearward. The pads 18, 20 and 22 can be made from an energy absorbing material. In a preferred embodiment the chambers or pads can be inflated with air, a gas or a fluid. The chambers or pads are constructed to be air and fluid tight so they can be inflated. Alternatively, they can be provided with a separate air or fluid bladder. The air or fluid bladder is located in the interior of the pad. The chambers or pads can be inflated or deflated through valves provided on the pads. A valve 26 is illustrated on pad 20. The chambers or pads can be inflated to different pressures whereby different amounts of protection are afforded the occupant of the seat. All of the chambers or pads can be inflated to the same or different pressure levels. The different pressure levels would correspond to different thicknesses of the pads. Occupants of different sizes and weights require different levels of protection. Thicker pads afford more protection.

Valve 26 could also function as an over inflation indicator. In this embodiment, the inflation indicator of valve 26 is set to a pre-selected pressure. Once the chambers or pads are inflated to this pressure the inflation indicator is activated. In a preferred embodiment, the indicator is audible. Other type of indicators can also be employed. In place of a single valve 26, the chambers or pads can also be provided with separate inflation and deflation valves. Although only one valve is illustrated, each of the individual chambers or pads 18, 20 and 22 can be provided with a separate inflation/deflation valve. The chambers or pads can be inflated by a hand pump prior to or after installation. A powered pump (not shown) can also be employed to inflate the chambers or pads. The powered pump can be incorporated into the safety seat so that the head protection assembly can be adjusted after an occupant is placed in the seat. The powered pump can also be activated by sensors based on the weight and/or other characteristics of the occupant of the seat. In addition to air any other fluid, such as a gas of liquid, can be employed to inflate the air bladders.

Figure 8:
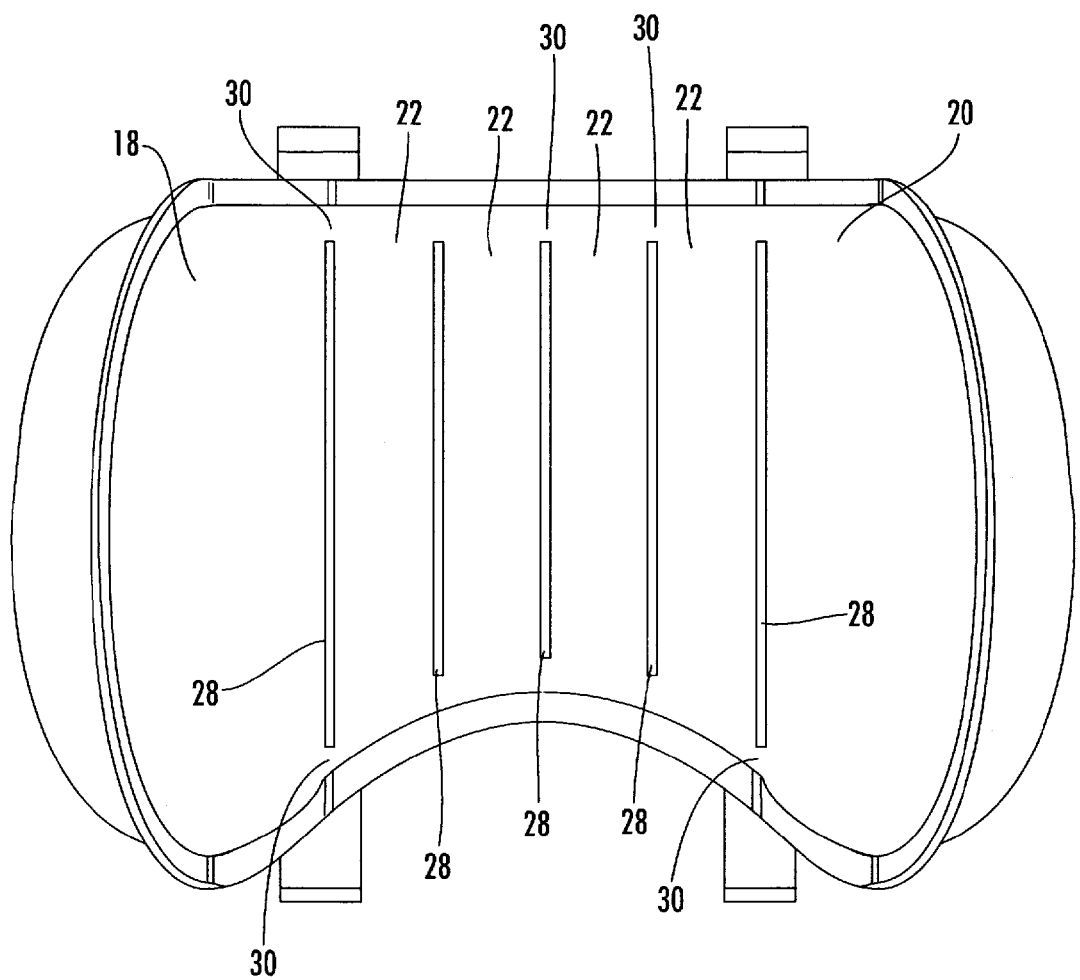
FIG. 8 is a section view of the head protection assembly of the present invention taken along line 8-8 of FIG. 3.
Figure 9:
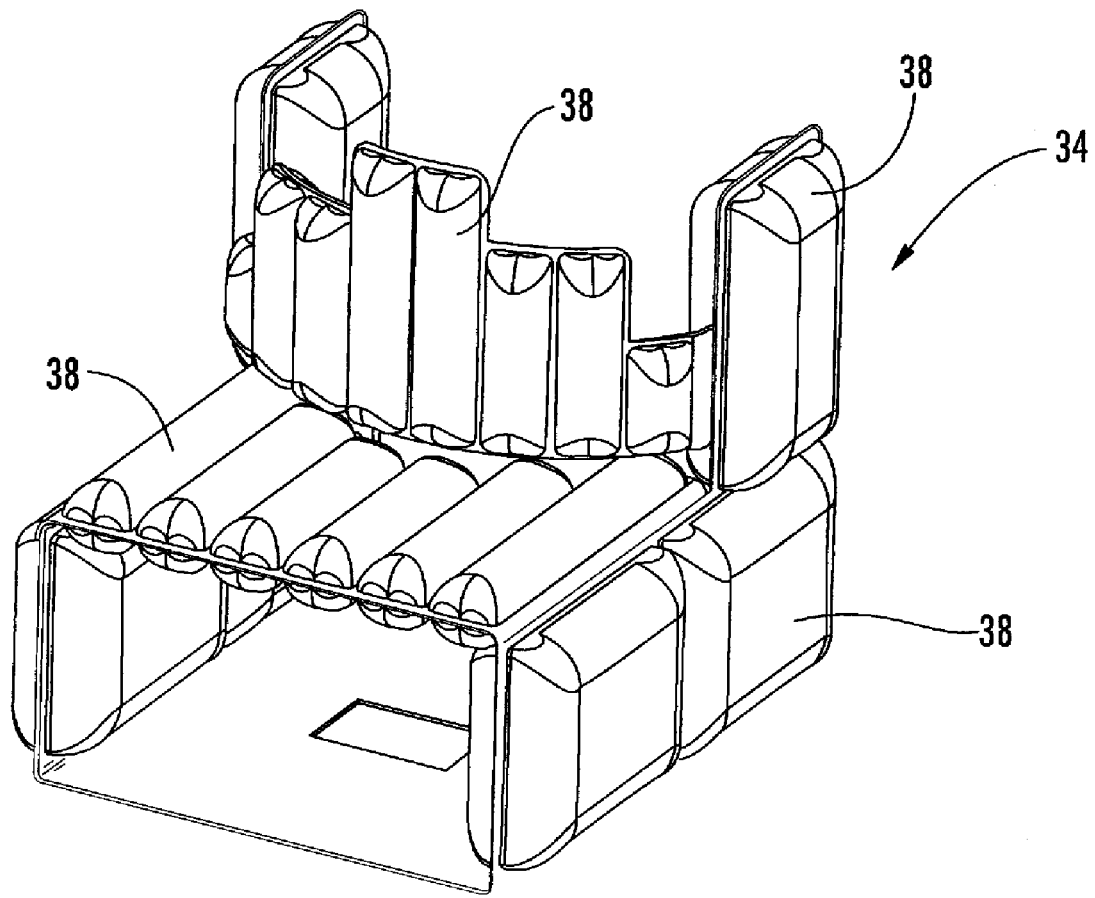
FIG. 9 is a front perspective view of the body protection assembly of the present invention.

In another embodiment, the chambers or pads 18, 20 and 22 can be fluidly connected together such that all the pads are inflated from a single fluid pressure source and they are inflated to the same pressure, as illustrated in FIG. 8. The chambers or pads 18, 20 and 22 are separated from each other by partitions 28 and are fluidly connected to each other by passages 30 located at the top and bottom of partitions 28. This arrangement allows air or fluid to be readily transferred between the compartments or pads. For example, if the safety seat occupant's head is thrown against chamber 18, as the result of a side impact crash, some air or fluid can escape from compartment 18 and be displaced into compartments 22 and 20. This enables compartment 18 to absorb more of the impact than if the air or fluid was not displaced. Therefore, the head of the seat occupant is better protected against injury than if the air or fluid remained in compartment 18.

In another embodiment, air or fluid in the chambers can be released through valve 26 when the seat occupant's head is thrown against one or more of the chambers. This release of fluid pressure functions in a manner similar to that described above, wherein the fluid is distributed between the air chambers, to further protect the head of the seat occupant.

The body 40 of the occupant of the seat is held securely in the seat by a restraint. The restraint can be one provided by the manufacturer of the safety seat or it can be an inflatable one illustrated as 34 in FIG. 1. The restraint 34 is secured to the seat by a strap or other means not shown. The inflatable restraint is provided with multiple chambers or pads 38 which can be filled with air or a fluid. In addition each chamber or pad 38 can be provided with a bladder which can also be filled with air or a fluid. The air or fluid bladder can be inflated to a preset level or the level can be adjusted based on the size and weight of the seat occupant in a manner similar to the head protection assembly 12 described above.

In place of air or fluids, foam can be used to fill the chambers or pads 18, 20, 22 and 38. One non-limiting example of this foam is visco-elastic polyurethane foam commonly known as memory foam which is commonly used in mattresses and pillows.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A head protection assembly comprising:
   at least one fluid chamber;
   said at least one fluid chamber being inflatable and deflatable,
   said at least one fluid chamber being constructed and arranged to be secured to a safety seat of a vehicle and positionable in alignment with a head of an occupant of the safety seat whereby the head of the occupant is protected against lateral and rearward movement caused by an impact relative to the safety seat,
   a plurality of separate fluid chambers connected to each other, at least two said fluid chambers positioned on both sides of the head of an occupant of the safety seat, wherein said plurality of separate fluid chambers are separated from each other by fluid impermeable barriers, at least one fluid passage connecting adjacent fluid chambers, said at least one fluid passage being constructed and arranged to permit fluid to be displaced from a first chamber into a second chamber upon impact of the head of an occupant of the seat and also to permit fluid to be displaced from said second chamber back into said first chamber upon removal of the head from contacting said first chamber, whereby fluid is distributed throughout said head protection assembly as a result of impact of the head of an occupant of the safety seat.

2. The head protection assembly of claim 1 including at least a third separate fluid chamber positioned at the rear of the head of the occupant of the seat whereby the head is protected against rearward movement caused by a forward or rearward impact relative to the seat.

3. The head protection assembly of claim 2 including a pump for selectively inflating and a release valve for selectively deflating said fluid chambers individually whereby said fluid chambers can be inflated or deflated relative to the size of an occupant of the seat.

4. The head protection assembly of claim 1 including a pump for selectively inflating said at least one fluid chamber and a release valve for selectively deflating said at least one fluid chamber whereby said at least one fluid chamber can be inflated or deflated relative to the size of an occupant of the seat.

5. The head protection assembly of claim 1 including a device securing said head restraint assembly to a seat.

6. The head protection assembly of claim 5 wherein said device securing said head restraint assembly is adjustable.

7. The head protection assembly of claim 5 wherein said device securing said head restraint assembly comprises a plurality of straps.

8. The head protection assembly of claim 1 including a fluid bladder positioned within said at least one fluid chamber, said fluid bladder being inflatable and deflatable.

9. The head protection assembly of claim 1 including
at least one expandable chamber;
said at least expandable chamber filled with foam;
said at least one expandable chamber being constructed and arranged to be secured to a safety seat of a vehicle and positionable in alignment with a head of an occupant of the safety seat whereby the head of the occupant is protected against lateral and rearward movement caused by an impact relative to the safety seat.

* * * * *